United States Patent [19]

West et al.

[11] Patent Number: 5,418,902
[45] Date of Patent: May 23, 1995

[54] ELECTRONIC SPREADSHEET-SYSTEM PRODUCING GENERALIZED ANSWERS INCLUDING FORMULAS

[75] Inventors: Vincent D. West, Reading; Edward Babb, Windsor Berks, both of Great Britain

[73] Assignee: International Computers Limited, London, England

[21] Appl. No.: 135,344

[22] Filed: Oct. 12, 1993

Related U.S. Application Data

[63] Continuation of Ser. No. 686,710, Apr. 17, 1991, abandoned.

[30] Foreign Application Priority Data

May 2, 1990 [GB] United Kingdom ............... 9009930

[51] Int. Cl.6 .......................................... G06F 15/02
[52] U.S. Cl. .................... 395/148; 395/149; 364/710.08
[58] Field of Search ...................... 395/148, 149; 364/710.08, 700, 406, 408, 401

[56] References Cited

FOREIGN PATENT DOCUMENTS 0247747 12/1987 European Pat. Off. .
0358492 3/1990 European Pat. Off. .

OTHER PUBLICATIONS 1.2.3 Quick Reference (Release 2.2), 1989, pp. 10–13.

Taylor, Using Lotus Spreadsheet for Deskmate, 1990, pp. 60–67.
M. Spenke, "A Spreadsheet Interface for Logic Programming", Sigchi Bulletin (Special Issue of the Conference on Human Factors), May, 1989, pp. 75–80.
R. Minch, "Logic Programming as a Paradigm for Financial Modeling", Management Information Systems Quarterly, vol. 13, No. 1, Mar. 1989, pp. 65–81.

*Primary Examiner*—Heather R. Herndon
*Assistant Examiner*—J. Feild
*Attorney, Agent, or Firm*—Lee, Mann, Smith, McWilliams, Sweeney & Ohlson

[57] ABSTRACT

An electronic spreadsheet consists of an array of cells into which a user can enter formulas and values. The contents of the spreadsheet cells are translated into a query in a high-level logic language such as the Pure Logic Language (PLL). The query is then re-written according to the rules of the logic language, to produce an answer. The answer is then translated back into formulas and values which can be displayed on the spreadsheet. The system provides a number of facilities not available on conventional electronic spreadsheets: it provides the ability to give generalised answers containing formulas rather than simply numbers, and provides the ability to solve goal-seeking problems, working backwards from a desired result.

3 Claims, 4 Drawing Sheets

Fig.3.

| | A | B | C | D |
|---|---|---|---|---|
| | QUIT CALC CLEAR LOAD SAVE FETCH CHART | | | |
| 1 | | "MILES" | "RATE" | "MONEY" |
| 2 | "NEWMILES" | 123 | | |
| 3 | "MILESBF" | 1327 | | |
| 4 | "MILESCF" | 1450 | | |
| 5 | "CLAIM" | | 5.9 | 7.257 |
| 6 | "VAT" | | .89 | 1.0947 |
| 7 | "TOTAL" | | | 8.3517 |
| 8 | | | | |
| 9 | | | | |

SHOWING ANSWERS

Fig.4.

| | A | B | C | D |
|---|---|---|---|---|
| | QUIT CALC CLEAR LOAD SAVE FETCH CHART | | | |
| 1 | | "MILES" | "RATE" | "MONEY" |
| 2 | "NEWMILES" | | | |
| 3 | "MILESBF" | 1327 | | |
| 4 | "MILESCF" | b2+b3 | | |
| 5 | "CLAIM" | | 5.90 | b2*c5/100 |
| 6 | "VAT" | | 0.89 | b2*c6/100 |
| 7 | "TOTAL" | | | d5+d6 |
| 8 | | | | |
| 9 | | | | |

SHOWING FORMULAS

Fig. 5.

| QUIT | CALC | CLEAR | LOAD | SAVE | FETCH | CHART |

| | A | B | C | D |
|---|---|---|---|---|
| 1 | | "MILES" | "RATE" | "MONEY" |
| 2 | "NEWMILES" | | | |
| 3 | "MILESBF" | 1327 | | |
| 4 | "MILESCF" | (b2+1327) | | |
| 5 | "CLAIM" | | 5.9 | (b2*5.9/100) |
| 6 | "VAT" | | .89 | (b2*.89/100) |
| 7 | "TOTAL" | | | (d5+d6) |
| 8 | | | | |
| 9 | | | | |

SHOWING ANSWERS

Fig. 6.

| QUIT | CALC | CLEAR | LOAD | SAVE | FETCH | CHART |

| | A | B | C | D |
|---|---|---|---|---|
| 1 | | "MILES" | "RATE" | "MONEY" |
| 2 | "NEWMILES" | 123 | | |
| 3 | "MILESBF" | 1327 | | |
| 4 | "MILESCF" | b2+b3 | | |
| 5 | "CLAIM" | | ^ | b2*c5/100 |
| 6 | "VAT" | | 0.89 | b2*c6/100 |
| 7 | "TOTAL" | | | d5+d6 & 9 |
| 8 | | | | |
| 9 | | | | |

SHOWING FORMULAS

Fig. 7.

| | A | B | C | D |
|---|---|---|---|---|
| | QUIT | CALC | CLEAR | LOAD | SAVE | FETCH | CHART |
| 1 | | "MILES" | "RATE" | "MONEY" |
| 2 | "NEWMILES" | 123 | | |
| 3 | "MILESBF" | 1327 | | |
| 4 | "MILESCF" | 1450 | | |
| 5 | "CLAIM" | | 6.42707 | 7.9053 |
| 6 | "VAT" | | .89 | 1.0947 |
| 7 | "TOTAL" | | | 9 |
| 8 | | | | |
| 9 | | | | |

SHOWING ANSWERS

Fig. 8.

| | A | B | C | D |
|---|---|---|---|---|
| | QUIT | CALC | CLEAR | LOAD | SAVE | FETCH | CHART |
| 1 | | "MILES" | "RATE" | "MONEY" |
| 2 | "NEWMILES" | 1231124 | | |
| 3 | "MILESBF" | 1327 | | |
| 4 | "MILESCF" | b2+b3 | | |
| 5 | "CLAIM" | | | b2*c5/100 |
| 6 | "VAT" | | 0.89 | b2*c6/100 |
| 7 | "TOTAL" | | | d5+d6 & 9 |
| 8 | | | | |
| 9 | | | | |

SHOWING FORMULAS

ELECTRONIC SPREADSHEET SYSTEM PRODUCING GENERALIZED ANSWERS INCLUDING FORMULAS

This application is a continuation of application Ser. No. 686,710, filed Apr. 17, 1991, now abandoned.

BACKGROUND TO THE INVENTION

This invention relates to electronic spreadsheets.

Electronic spreadsheets are widely used in computer systems, for applications such as accounting and planning. Typically, a spreadsheet consists of an array of cells, displayed on a screen, into which the user can enter values or formulas. When requested by the user, the system automatically calculates the results of the formulas and displays these results in the appropriate cells of the spreadsheet.

The object of the present invention is to provide an improved electronic spreadsheet which is capable of providing more facilities than a conventional spreadsheet.

SUMMARY OF THE INVENTION

According to the invention there is provided an electronic spreadsheet system comprising:
(a) user interface means for displaying a spreadsheet and for allowing a user to enter formulas and values into cells of the spreadsheet,
(b) means for converting the contents of the spreadsheet cells into a query in a high level logic language,
(c) means for re-writing the query according to predetermined logic rules to produce an answer, and
(d) means for converting the answer into formulas and/or values for display on the spreadsheet.

BRIEF DESCRIPTION OF THE DRAWINGS

FIG. 1 is a block diagram showing an electronic spreadsheet system in accordance with the invention.

FIGS. 2-8 show examples of displays produced by the electronic spreadsheet system.

DESCRIPTION OF AN EMBODIMENT OF THE INVENTION

Figures 1, 2:
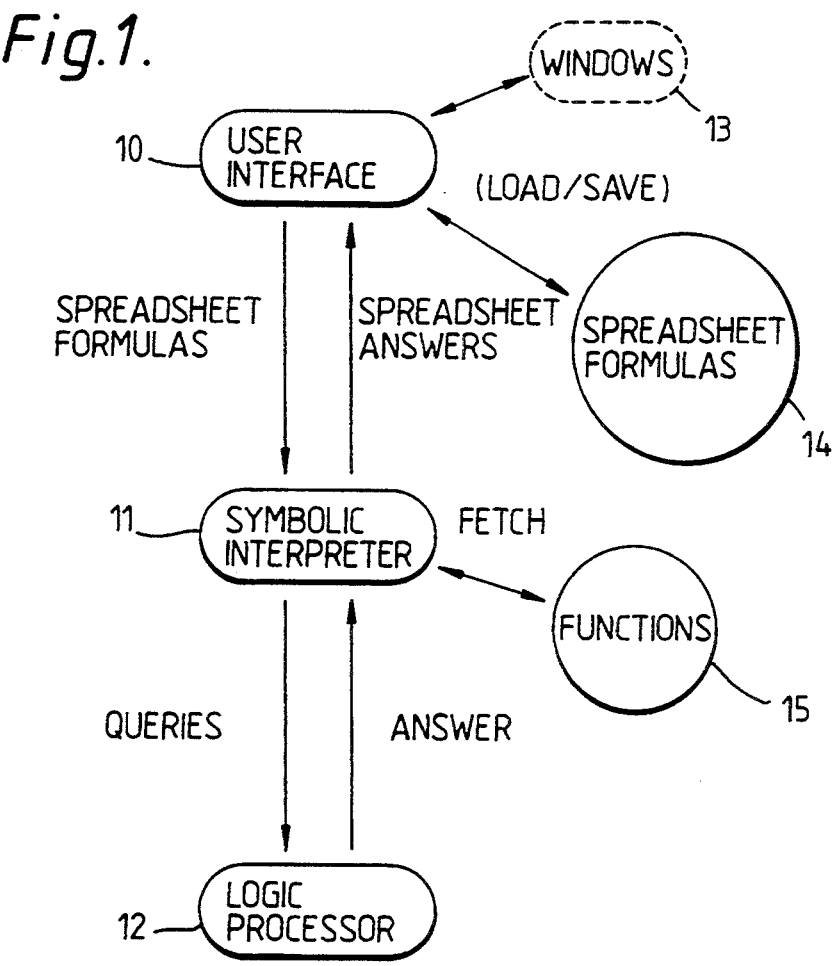

One electronic spreadsheet system in accordance with the invention will now be described by way of example with reference to the accompanying drawings.

Referring to FIG. 1, the system comprises a user interface 10, a symbolic interpreter 11, a logic processor 12. Each of the modules is conveniently implemented by software means, running on a conventional computer system.

The user interface 10 handles all communication with the user, by way of a conventional window operating system 13. In particular, the user interface 10 creates a spreadsheet display, and allows the user to edit and update the spreadsheet by inserting values and formulas into the cells of the spreadsheet. Formulas and values can be saved in a file 14 and then re-loaded into the spreadsheet when required by the user.

The values in the spreadsheet cells may be numbers, strings or lists. The formulas may involve arithmetic, logic, comparison, string or list operators, or user-defined functions.

The symbolic interpreter 11 examines the contents of each spreadsheet cell in turn, and converts or translates them into rules in a high-level logic language which in this example is PLL. The language PLL is described in "Pure logic language" by E. Babb, ICL Technical Journal, Published by International Computers Ltd at Oxford University, England, May 1989.

This conversion includes supplying any variables and operators which are implicit in the spreadsheet format. For example, if cell x contains a formula y+2, then this is translated into a rule of the form x=y+2; i.e. the cell name "x" and the operator "=" are supplied explicitly. In the case of a user-defined function, this is interpreted according to the function definition supplied by the user in a file 15. The first argument of each such function is assumed to be the name of the cell in which the function is located, and so the interpreter 11 must supply this variable explicitly when converting the function reference.

The symbolic interpreter 11 then constructs a PLL query, comprising the AND of all the rules for the individual cells, and passes this to the logic processor 12.

The logic processor 12 receives the query, and processes it by re-writing it according to the rules of the PLL language, to provide an answer to the query. This involves simplifying the query where possible. For example, a query of the form.

$$x=y+2 \& y=3$$

would be re-written to provide an answer in the form $$x=5 \& y=3$$

The answers produced by the logic processor 12 are then passed back to the symbolic interpreter 11, which then converts the answers into formulas and values for displaying on the spreadsheet. For example, the answer $$x=5 \& y=3$$

would cause the value 5 to be displayed in cell x and the value 3 to be displayed in cell y of the spreadsheet.

Referring now to FIG. 2, this shows an example of a typical display produced by the electronic spreadsheet system.

The display comprises an array of cells, arranged in columns A, B, . . . and rows 1, 2, . . . . Each cell is referenced by its row and column position: for example, the top left-hand cell is cell al.

The boxes at the top of the display labelled "Quit", "Calc" etc are used as buttons, to trigger a desired action. These are used in conjunction with a pointing device, such as a mouse. In order to select an action, the mouse is used to position a cursor in the desired box, and a control button on the mouse is then pressed to initiate the action. This is referred to as "clicking" on the selected button. The functions of the buttons are as follows:

Calc—clicking on this button causes the system to calculate the results of the formulas in the spreadsheet, and to display the results. This involves activating the symbolic interpreter 11 and logic processor 12 to convert and re-write the formulas as described above.

As will be described later, there may be more than one set of results for a particular set of formulas. In this case, each time the Calc button is clicked, a further set of results is displayed.

When all the sets of results have been displayed, clicking again on the Calc button returns to the originally displayed formulas.

Quit—where there is more than one set of results, and not all of them have been displayed yet, clicking on this button causes the further sets of results to be ignored and returns to the originally displayed formulas. Otherwise, it exits from the spreadsheet.

Load—loads formulas from the file 14 into the spreadsheet.

Save—saves formulas from the spreadsheet into the file 14.

Fetch—fetches the rules from the file 15.

FIG. 2 shows an example of use of the spreadsheet to calculate expense claims for car mileage.

In this example, the cells are defined as follows:
b2—current mileage
b3—total mileage brought forward
b4—total mileage carried forward (b2+b3)
c5—rate per mile, excluding value added tax (VAT)
c6—VAT element per mile
d5—expense claim, excluding VAT (b2×c5/100)
d6—VAT element of expense claim (b2×c6/100)
d7—total claim (d5+d6)

To use the spreadsheet in this example, the user would normally type the current mileage into box b2, and then click on the Calc button.

The result is as shown in FIG. 3. It can be seen that all the formulas have been replaced by numerical results. For example, box d7 indicates that the total expense is £8.3517.

In the example illustrated in FIGS. 2 and 3, the spreadsheet produces the same results as a conventional spreadsheet. However, the invention also provides further facilities not available on conventional spreadsheets, as will now be described.

Referring to FIG. 4, this shows the same spreadsheet as in FIG. 2, except that in this case the value in cell b2 has been deleted. This makes b2 a variable value.

If the user now clicks on the Calc button, answers are displayed as shown in FIG. 5. It can be seen that in this case, some of the answers are formulas, rather than numeric values, because the logic processor 12 was not able to simplify the query any further. For example, box b4 contains the formula b2+1327.

Thus, the present system provides the ability to give generalised answers containing formulas as well as numbers, where some of the necessary values are unknown. This facility is not available on conventional spreadsheet systems.

Referring now to FIG. 6, this again shows the same spreadsheet as in FIG. 2, except that in this case the value in cell c5 has been deleted, and cell d7 has been modified by adding "&9". The effect of this is to make c5 a variable, and to specify that the cell d7 must have the value 9.

If the user now clicks on the Calc button, answers are displayed as shown in FIG. 7. It can be seen that, in this case, the system has calculated a value 6.42707 for cell c5 which gives the required result 9 in cell d7.

Thus, the system provides the ability to solve goal-seeking problems; that is, to calculate backwards to obtain the input values that would be required to get a particular desired answer. This facility is not available on conventional spreadsheet systems.

Referring now to FIG. 8, this shows the same spreadsheet as in FIG. 6, but in this case, two alternative values 123 and 124 have been inserted in cell 2 using the vertical stroke symbol to indicate the logic operator "OR".

In this case, when the user clicks on the Calc button, the system will display answers calculated using the first of these alternatives: for example, the formula in cell b4 is replaced by the value 1450. If the user now clicks again on the Calc button, the second alternative is displayed: for example, b4 shows 1451.

The system is also able to handle the case where alternatives are presented in more than one cell. In this case, answers are calculated for each possible combination of these alternatives. For example, if there are two alternative values for cell b2 and two alternatives values for cell c5, then there are four possible values for cell d5 for example, each of which can be displayed in turn by clicking on the Calc button.

It should be noted that many modifications of the system described above may be made without departing from the scope of the present invention. In particular, in a practical spreadsheet system, there would normally be more rows and columns of cells than in the example described above.

We claim:

1. An electronic spreadsheet system comprising:
   (a) means for displaying a spreadsheet comprising a plurality of spreadsheet cells,
   (b) user interface means for allowing a user to enter input formulas and input values into said spreadsheet cells and for displaying said input formulas and input values in said spreadsheet cells, each said input value being displayed in a respective cell, each said input formula being displayed in a respective cell and including at least one variable whose value corresponds to the value of another cell, the variable being indicated in the displayed input formula by the name of the other cell, and each said input formula including, for modifying the variable, at least one operator or function included in the group consisting of arithmetic, logic, comparison, string and list operators and user-defined functions,
   (c) means for reading said input formulas and input values from said spreadsheet cells and for converting each of said input formulas and input values into a respective rule, each rule being associated with a respective cell and including the name of the respective cell and the corresponding input formula or input value and being in a high-level logic language,
   (d) means for processing said rules in accordance with the high-level logic language to produce a plurality of simplified rules, each associated with a respective cell,
   (e) means for converting said simplified rules into output formulas and output values, output formulas arising when output values are indeterminate, and
   (f) means for displaying said output formulas and said output values in the spreadsheet cells, each output value being displayed in a respective cell, each output formula being displayed in a respective cell and including at least one variable whose value is indeterminate and corresponds to the value of another cell, the indeterminate value being indicated in the displayed output formula by the name of the other cell, and each displayed output formula including, for modifying the variable, at least one operator or function included in the group consisting of arithmetic, logic, comparison, string and list operators and user-defined functions.

2. An electronic spreadsheet system comprising:

(a) means for displaying a spreadsheet comprising a plurality of spreadsheet cells, (b) user interface means for allowing a user to enter input formulas and input values into said spreadsheet cells and for displaying said input formulas and input values in said spreadsheet cells, each said input value being displayed in a respective cells, each said input formula being displayed in a respective cell and including at least one variable whose value corresponds to the value of another cell, the variable being indicated in the displayed input formula by the name of the other cell, and each input formula including, for modifying the variable, at least one operator or logic function included in the group consisting of arithmetic, logic, string and list operators and user-defined functions, (c) means for reading said input formulas and input values from said spreadsheet cells and for converting each of said input formulas and input values into a respective rule, each rule being associated with a respective cell and including the name of the respective cell and the corresponding input formula or input value and being in a high-level logic language, (d) means for processing said rules in accordance with the high-level logic language to produce at least one simplified rule, each associated with a respective cell, (e) means for converting said simplified rule into an output formula, and (f) means for displaying said output formula in one of the spreadsheet cells, said output formula including at least one variable whose value is indeterminate and corresponds to the value of another cell, the indeterminate value being indicated in the displayed output formula by the name of the other cell, and the displayed output formula including, for modifying the variable, at least one operator or function included in the group consisting of arithmetic, logic, comparison, string and list operators and user-defined functions.

3. A method of operating an electronic spreadsheet system, the method comprising:

(a) displaying a spreadsheet comprising a plurality of spreadsheet cells, (b) entering input formulas and input values into said spreadsheet cell and displaying said input formulas and input values in said spreadsheet cells, each said input value being displayed in a respective cell, each said input formula being displayed in a respective cell and including at least one variable whose value corresponds to the value of another cell, the variable being indicated in the displayed formula by the name of the other cell, and each input formula including, for modifying the variable, at least one operator or function included in the group consisting of arithmetic, logic, comparison, string and list operators and user-defined functions, (c) reading said input formulas and input values from said spreadsheet cells and converting each of said input formulas and input values into a respective rule, each rule being associated with a respective cell and including the name of the respective cell and the corresponding input formula or input value and being in a high-level logic language, (d) processing said rules in accordance with the high-level logic language to produce a plurality of simplified rules, each associated with a respective cell, (e) converting said simplified rules into output formulas and output values, output formulas arising when output values are indeterminate, and (f) displaying said output formulas and output values in said spreadsheet cells, each output value being displayed in a respective cell, each output formula being displayed in a respective cell and including at least one variable whose value is indeterminate and corresponds to the value of another cell, the indeterminate value being indicated in the displayed output formula by the name of the other cell, and each displayed output formula including, for modifying the variable, at least one operator or function included in the group consisting of arithmetic, logic, comparison, string and list operators and user-defined functions.

* * * * *

UNITED STATES PATENT AND TRADEMARK OFFICE
CERTIFICATE OF CORRECTION

PATENT NO. : 5,418,902
DATED : May 23, 1995
INVENTOR(S) : West, et al

It is certified that error appears in the above-indentified patent and that said Letters Patent is hereby corrected as shown below:

On the title page: Item (21) should read --135,844--.

Signed and Sealed this

Twenty-second Day of August, 1995

Attest:

BRUCE LEHMAN

Attesting Officer

Commissioner of Patents and Trademarks